US008739564B2

(12) United States Patent
Major et al.

(10) Patent No.: US 8,739,564 B2
(45) Date of Patent: Jun. 3, 2014

(54) CONTROLLING TEMPERATURE OF VEHICLE DEVICES USING A VARIABLE SPEED FAN (75) Inventors: Gregory A. Major, Farmington Hills, MI (US); Lawrence P. Ziehr, Clarkston, MI (US); William R. Hill, Troy, MI (US); Thomas K. Lockwood, Fenton, MI (US); Todd M. Tumas, Taylor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 752 days.

(21) Appl. No.: 12/050,193

(22) Filed: Mar. 18, 2008

(65) Prior Publication Data

US 2009/0236089 A1    Sep. 24, 2009

(51) Int. Cl.
B60H 1/00 (2006.01)
F25D 17/00 (2006.01)

(52) U.S. Cl.
USPC .............. 62/180; 62/177; 62/178; 62/186

(58) Field of Classification Search
USPC ......... 62/178, 180, 186, 230, 296; 123/41.11, 123/41.12
See application file for complete search history.

(56) References Cited

U.S. PATENT DOCUMENTS

| 4,171,931 | A  | * | 10/1979 | Harada .......................... 417/22 |
| 6,199,398 | B1 |   | 3/2001  | Takeuchi et al. |
| 6,328,000 | B1 | * | 12/2001 | Hawkins et al. ........... 123/41.12 |
| 6,796,138 | B1 | * | 9/2004  | Imai et al. ....................... 62/236 |
| 7,098,617 | B1 | * | 8/2006  | Oljaca et al. .................. 318/268 |
| 7,275,368 | B2 |   | 10/2007 | Furuta et al. |
| 2002/0066422 | A1 | * | 6/2002 | Hawkins et al. ........... 123/41.12 |
| 2003/0041814 | A1 | * | 3/2003 | Laird et al. ................. 123/41.12 |
| 2006/0006246 | A1 | * | 1/2006 | Kim ............................. 236/49.3 |
| 2006/0112702 | A1 | * | 6/2006 | Martin et al. .................. 62/180 |
| 2006/0120903 | A1 |   | 6/2006  | Iwasaki et al. |
| 2007/0129874 | A1 | * | 6/2007 | Bays ............................ 701/102 |

FOREIGN PATENT DOCUMENTS

| DE | 7112684 U     | 3/1971 |
| DE | 19743828 A1   | 4/1994 |

OTHER PUBLICATIONS

"Fans—Efficiency and Power Consumption" by The Engineering Toolbox; pp. 1-3; 2005.*

* cited by examiner

Primary Examiner — Marc Norman
Assistant Examiner — Paolo Gonzalez (57) ABSTRACT

A method for controlling a fan in a vehicle includes comparing the current temperature of at least a first device and a second device to multiple temperature ranges for each of said devices and determining on the basis of said comparisons whether fan speed should be changed, increasing fan speed to a maximum fan speed if at least one of the comparisons indicates that the maximum fan speed is desired, increasing fan speed to a reference fan speed if at least one of the comparisons indicates that an increase in fan speed less than the maximum fan speed is desired, and decreasing fan speed to a reference fan speed if the comparisons indicate that a decrease in fan speed is desired.

8 Claims, 6 Drawing Sheets

CONTROLLING TEMPERATURE OF VEHICLE DEVICES USING A VARIABLE SPEED FAN

BACKGROUND OF INVENTION

The present invention relates generally to a fan located in a motor vehicle for transferring heat by convection from various components, devices or systems using an air stream produced by the fan.

In a hybrid electric vehicle, or a vehicle whose power source is a fuel cell, or a vehicle having a conventional powertrain, a fan having variable speed and operating efficiency is used to maintain temperature in an acceptable range in various vehicle systems. Each system has a specific temperature range at which the system operates at optimum efficiency. The vehicle systems affected by operation of the fan may include engine coolant, transmission oil, power steering oil, engine oil, electric motor and power electronics coolant, fuel cell stacks, battery thermal systems, engine charge air coolers, and refrigerant or air conditioning.

A need exists for a strategy that addresses the temperature requirements of the systems and controls the fan such that its energy consumption, fan power and fan noise are minimized. Preferably the control strategy will also minimize the combined energy consumption both of the fan and of other devices associated with the vehicle systems, such as a refrigerant compressor.

The control strategy should also minimize noise, vibration and harshness (NVH) of the dynamic systems affected by fan operation.

SUMMARY OF INVENTION

An embodiment contemplates a method for controlling a fan in a vehicle by comparing the current temperature of at least a first device and a second device to multiple temperature ranges for each of said devices and determining on the basis of said comparisons whether fan speed should be changed, increasing fan speed to a maximum fan speed if at least one of the comparisons indicates that the maximum fan speed is desired, increasing fan speed to a reference fan speed if at least one of the comparisons indicates that an increase in fan speed less than the maximum fan speed is desired, and decreasing fan speed to a reference fan speed if the comparisons indicate that a decrease in fan speed is desired.

An advantage of an embodiment is the minimization of fan power consumption and fan noise over a wide range of operating modes, improve fuel efficiency, improve NVH, and incorporate control strategy to control front end fans to minimize energy consumption in hybrid, fuel cell and traditional vehicles to minimize fan power and fan noise. The increasing need to actively control temperatures of multiple vehicle systems (engine coolant, transmission oil, power steering oil, components in the engine compartment, engine oil, electric motor and power electric coolant, fuel cell stacks, battery thermal systems, charge air coolers, air conditioning), with each having a specific optimum control point for efficient point, is met. This control strategy controls fan speeds to minimize fan power to meet the cooling needs of each system and incorporate HVH controls to minimize fan noise to achieve vehicle requirements.

DETAILED DESCRIPTION

Figure 1A:
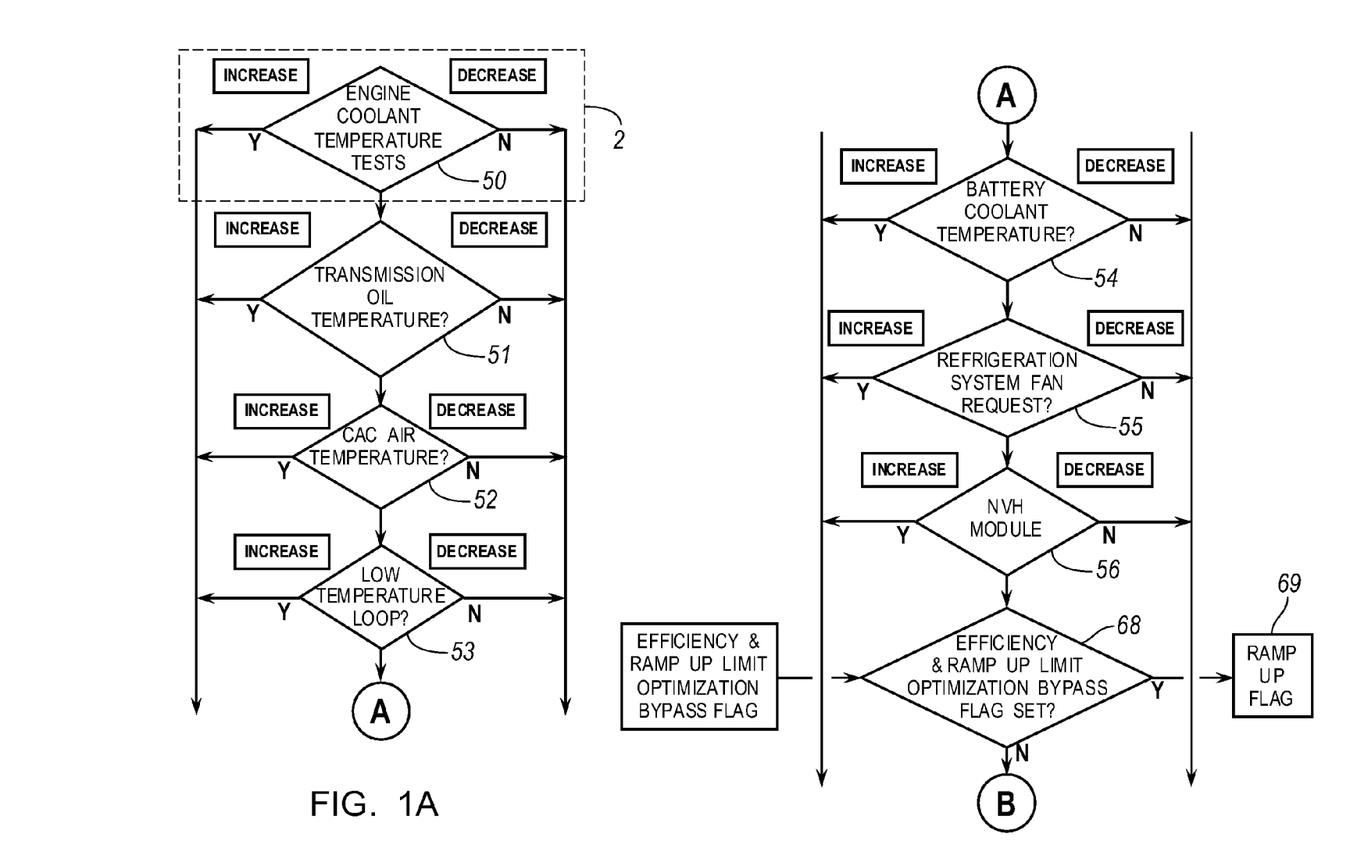
FIGS. 1A and 1B comprise a logic flow diagram illustrating a fan speed control for a motor vehicle.
Figure 1B:
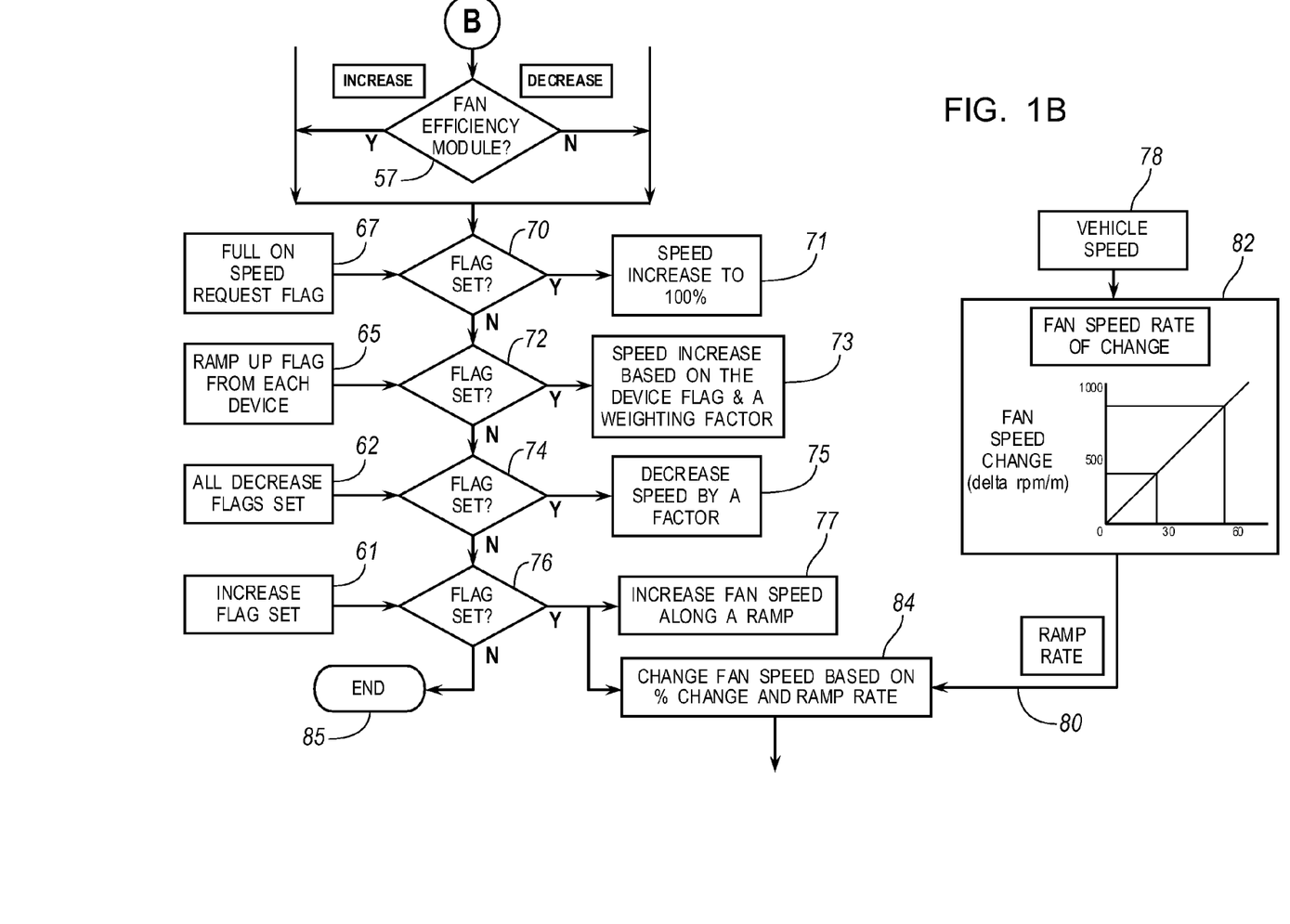

Referring to FIG. 1A, a series of tests 50-54 based on the number of components/subsystems requiring temperature control are made to determine, for each component or system, whether to set a flag that indicates a need to increase fan speed or to set another flag that indicates a need to decrease fan speed. In FIGS. 1A and 1B, the increase and decrease arrows represent the nature of the flag that is set, i.e., a need to increase or decrease fan speed for each system or component that would be cooled by an air stream produced by the fan. If an increase fan speed flag is set, a control algorithm determines whether to increase fan speed, the magnitude of the new speed, and the rate of the speed change. If a decrease fan speed flag is set, the control algorithm determines whether to decrease fan speed, the magnitude of the new speed, and the rate of the speed change.

The devices and systems whose temperatures are tested may include engine coolant 50, transmission oil temperature (TOT) 51, charge air cooler (CAC) 52, low temperature loop 53, battery coolant temperature 54, and refrigeration system fan 55. The low temperature loop is a coolant loop having an operating temperature lower that the engine cooling system. A vehicle may include multiple low temperature loops for cooling power electronics, electric motors, engine charge air, a hybrid battery, fuel cell stack, etc.

Figure 2:
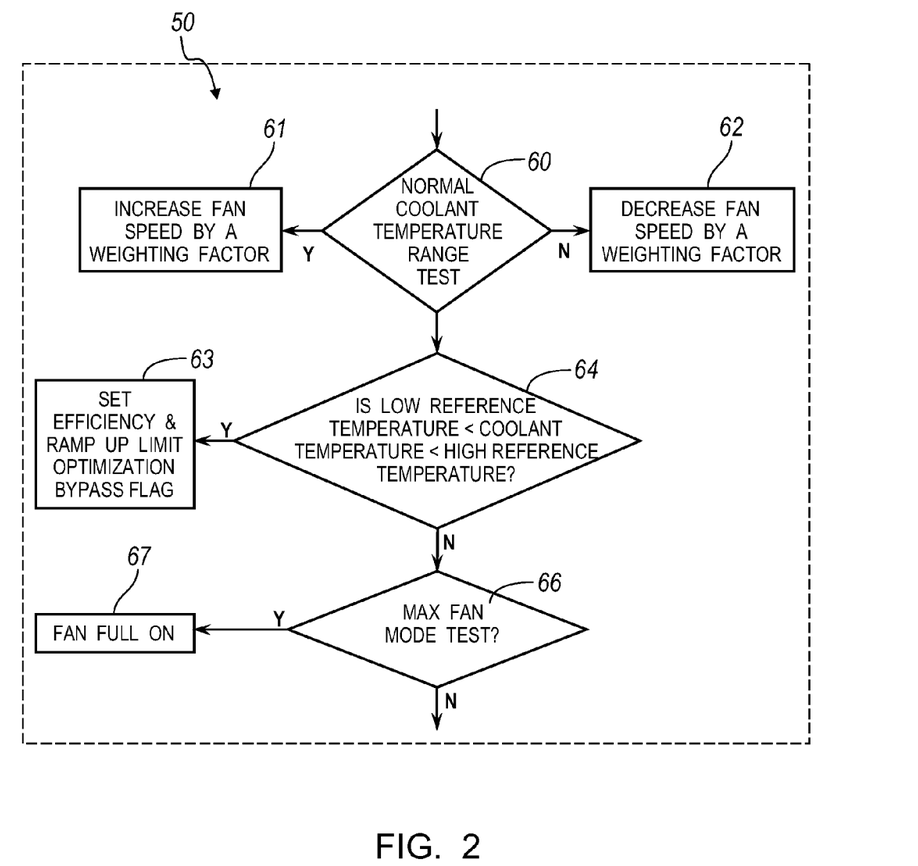
FIG. 2 shows the control logic steps of the engine coolant control module shown in FIG. 1.

FIG. 2 illustrates that the decision block 50 for the engine cooling system includes two normal coolant temperature range tests 60 to determine (1) whether engine coolant temperature is greater than a normal maximum reference temperature, and (2) whether engine coolant temperature is less than a normal minimum engine coolant temperature range. If the result of test 60 (1) indicates that coolant temperature is greater than a normal maximum temperature, a flag is set at 61 indicating that fan speed is to be increased by a weighting factor. If the result of test 60 (2) indicates that coolant temperature is less than a normal minimum temperature, a flag is set at 62 indicating that fan speed is to be decreased by a weighting factor. Tests 60 (1) and 60 (2) may set neither fan speed flag.

Decision block 50 further includes intermediate coolant temperature range test 64, which determines whether current engine coolant temperature is in a range between a maximum intermediate reference temperature and a minimum intermediate reference temperature. If the result of test 64 is logically true, a flag is set at 63 indicating a bypass of efficiency and ramp-up limit optimization.

If the result of test 64 is false, no flag is set, indicating that an efficiency and ramp-up limit optimization is to be performed at step 57, and control advances to step 66.

At step 68, a test is made to determine whether the efficiency and ramp-up limit optimization bypass flag has been set for any of the devices being tested at steps 50-54. If the result of test 68 is true for any of the devices tested at 50-54, a fan speed ramp-up flag is set at step 69 for the respective device, before steps 70-76 are executed.

If the result of test 68 is false for each of the devices tested at 50-54, no fan speed ramp-up is performed and control advances to step 57.

Decision block 50 further includes a maximum fan mode test 66, which determines whether current engine coolant temperature is in a range between a maximum high reference temperature and a minimum high reference temperature. If the result of test 66 is logically true, a flag is set at 67 indicating that fan speed is to be increased to its maximum speed, otherwise no flag is set.

Each of the tests 51-54 for corresponding devices, components and systems comprises the series of tests described with reference to FIG. 2. Therefore, one flag will be set for each of the first two tests 60(1) and 60(2), a flag may be set for test 64, and a flag may be set for test 66.

Referring to FIG. 1B, a test is made at step 70 to determine whether any fan speed full-on flag 67 is set. If the result of test 72 is true, at 71 fan speed is increased to its maximum speed.

If the result of test 70 is false, control advances to step 72 where a test is made to determine whether any fan speed ramp-up flag is set as a result of executing step 57, as described below with reference to FIG. 5. If any fan speed ramp-up flag is set, the result of test 72 is true and fan speed is increased at step 73 by a calibrated factor based on the device whose fan speed ramp-up flag is set.

If the result of test 72 is false, control advances to step 74 where a test is made to determine whether each fan speed decrease flag 62 for each device 50-54 is set. If the result of test 74 is true, fan speed is decreased at 75 by a calibrated factor.

If the result of test 74 is false, control advances to step 76 where a test is made to determine whether any fan speed increase flag 61 is set for any of the devices tested at steps 50-54. If the result of test 76 is true, the increased fan speed is determined at step 77 as a factor of current fan speed. The rate of change of fan speed is determined at steps 78 and 82.

If the result of test 76 is true, vehicle speed is determined at 78, and a desired rate of change of fan speed 80 is determined from a function 82, which is indexed by vehicle speed and a value attributed to the device or devices that require an increase in fan speed. Fan speed is changed at 84 at the desired rate of change 80 and the algorithm is exited at step 85.

Figure 3:
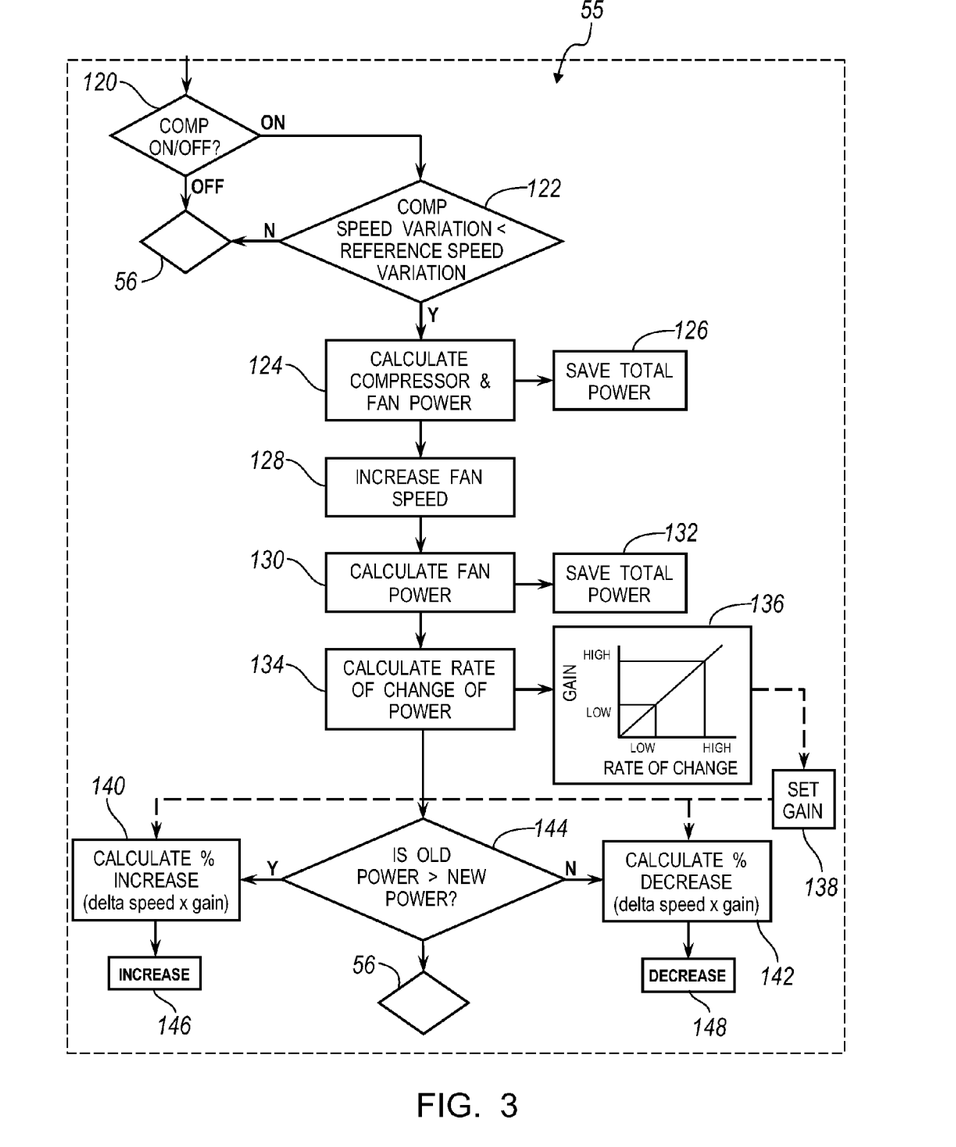
FIG. 3 shows the control logic steps of the refrigerant system fan speed request module shown in FIG. 1.

FIG. 3 illustrates in greater detail the control steps of the refrigerant system fan speed request 55, which is executed immediately after step 54 as shown in FIG. 1A. At step 120, the on/off operating state of the compressor of the refrigerant system is checked. If the compressor is off, control moves to step 56.

But if the compressor is on, at step 122 a test is performed to determine whether the compressor speed has a high variation due to changes in engine speed. If the compressor speed variation is greater than a reference variation in compressor speed, control advances to step 56 and the refrigerant system fan speed request 55 is skipped. If the compressor speed variation is less than the reference speed variation, the magnitude of power required currently to drive both the compressor and the fan is calculated at step 124, and stored in electronic memory at step 126.

Experience shows that increasing fan speed can reduce the load on the compressor. Therefore, fan speed is increased at 128, a new total power required to drive the compressor and fan at its increased speed is calculated at step 130 and is stored in electronic memory at step 132.

The rate at which the new total power required to drive the compressor and fan is changing with respect to time is determined at step 134 and is used as an index to determine a desired gain from function 136. The desired gain is set at step 138 and stored in electronic memory for use at steps 140, 142. The desired gain is the desired time rate of change of fan speed.

A test is performed at step 144 to determine whether the total power that is stored at step 126 is greater than the total power that is stored at step 132. If the result of test 144 is true, a change in fan speed is calculated at step 140 from the product of the change in fan speed and the desired gain. A flag indicating an increase in fan speed is set at 146 with a calibrated weighting factor.

If the result of test 144 is false, a change in fan speed is calculated at step 142 from the product of the change in fan speed and the desired gain. A flag indicating a decrease in fan speed is set at 148 with a calibrated weighting factor.

Figure 4:
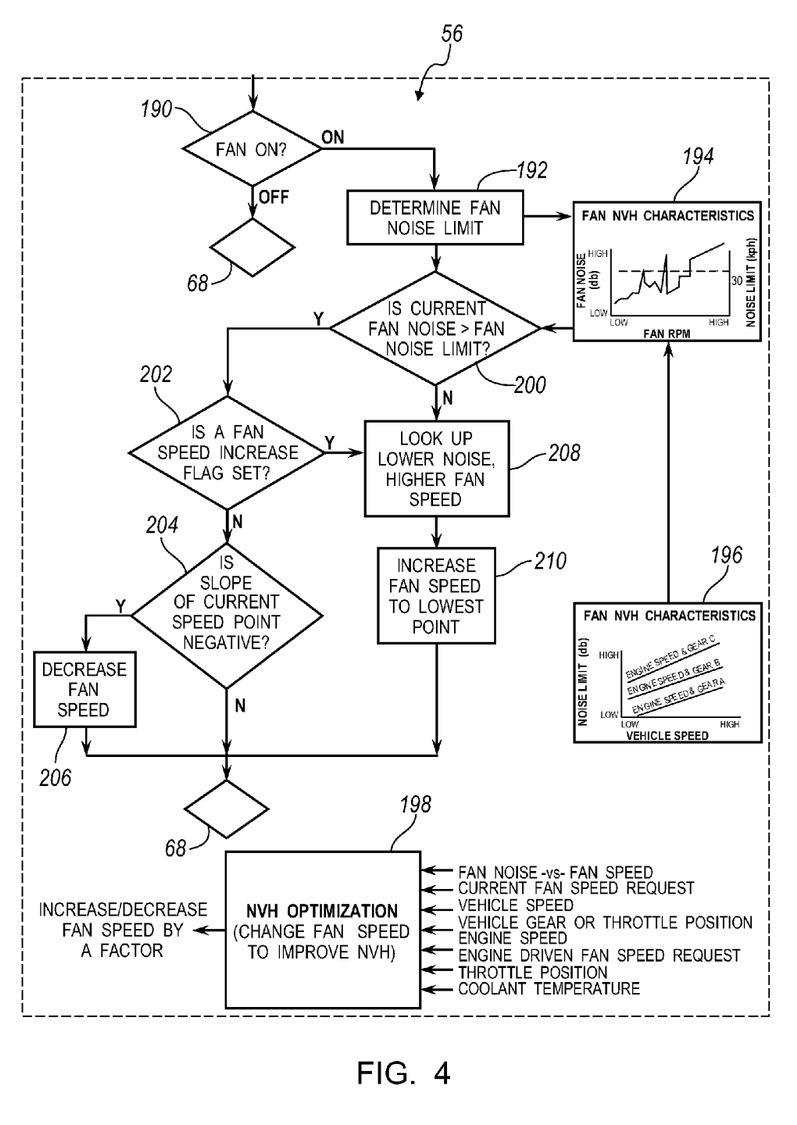
FIG. 4 shows the control logic steps of the NVH control module shown in FIG. 1.

FIG. 4 illustrates control steps for optimizing NVH represented by the NVH module 56 of FIG. 1. If the test at step 190 indicates that the fan is on, control advances to step 192 to determine the current fan noise from a function 194, which is indexed by current fan speed. The target fan noise limit appears in graph 194 as a horizontal line.

The target fan noise limit may be a dynamic value determined from function 196, whose independent variables include vehicle speed, engine speed and the current gear produced by a transmission. The target fan noise limit may depend on these and other variables including throttle position, fan speed, engine speed, and engine coolant temperature. NVH is optimized at 198 by either increasing or decreasing fan speed by a calibrated factor.

At 200, a test is made to determine whether current fan noise is greater than the target fan noise limit. If the result of test 200 is true, control passes to step 202, where a test is made to determine if a fan speed increase flag 73, 75, 77 is set.

If the result of test 202 is false, at step 204 a test is made to determine whether the slope of the fan noise function 194 is negative for the current fan speed.

If the result of test 204 is true, at step 206 fan speed is decreased by a factor and control advances to step 68. But if the result of test 204 is false, indicating that the slope of function 194 is positive for the current fan speed, control advances to step 68 without increasing fan speed.

If the result of test 200 is false indicating that fan noise is less than the fan noise limit, or the result of test 202 is true indicating that a fan speed increase flag is set, at step 208 a higher fan speed having a lower noise than the corresponding fan speed limit is determined, e.g., from function 194. At step 210, fan speed is increased to the fan speed determined in step 208 and control advances to step 68.

Figure 5:
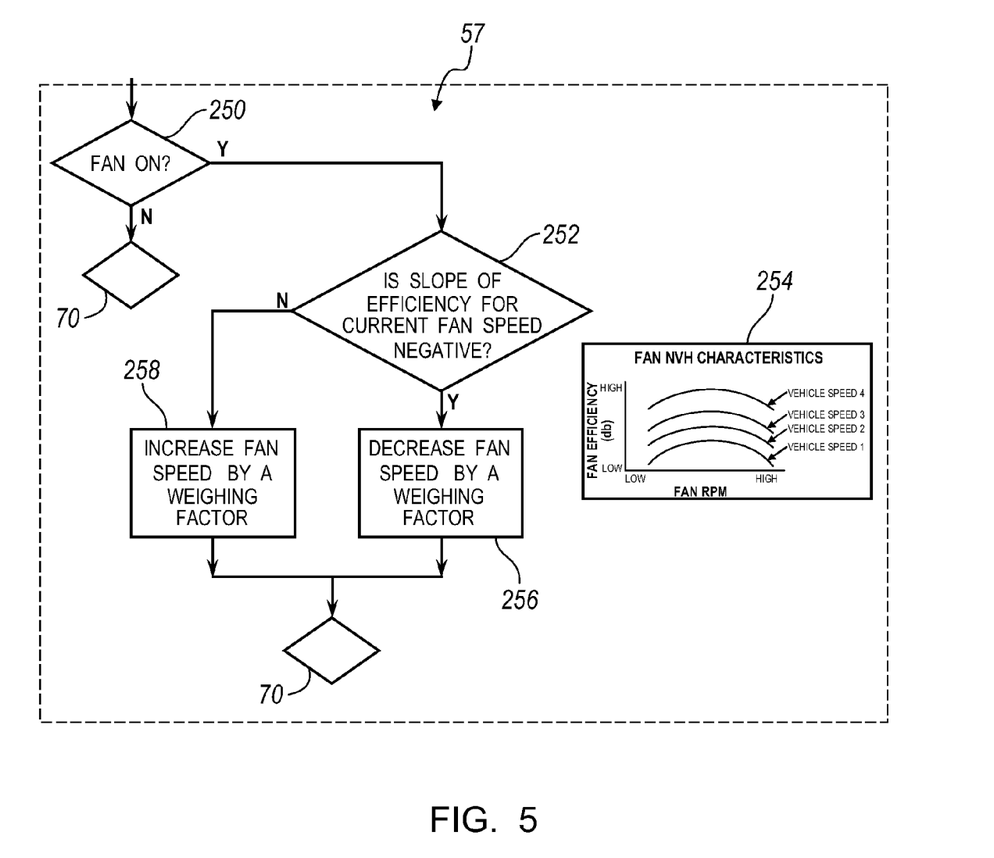
FIG. 5 shows the control logic steps of the fan efficiency control module shown in FIG. 1.

FIG. 5 illustrates the steps of the fan efficiency module 57 of FIG. 1B. If the test at step 250 indicates that the fan is off, control advances to step 70. But if the test at step 250 indicates that the fan is on, control advances to step 252 to determine from function 254 whether the slope of fan efficiency is negative for the current fan speed. If the efficiency slope is negative, fan speed is decreased at step 256 by a calibrated weighting factor. If the efficiency slope is positive, fan speed is increased at step 258 by a calibrated weighting factor. In this way, fan speed is changed to an optimized fan speed, at which electric power consumption required to drive the fan is reduced.

Throughout the description, the term "fan" applies to a blower that produces an air stream. The terms "device" and "system" applies to a component whose temperature is affected by the speed and temperature of the air stream.

While certain embodiments of the present invention have been described in detail, those familiar with the art to which this invention relates will recognize various alternative designs and embodiments for practicing the invention as defined by the following claims.

What is claimed is:

1. A method for controlling a fan that cools devices of a vehicle comprising: (a) comparing the current temperatures of at least first and second said devices to multiple temperature ranges of each of said devices and determining on the basis of said comparisons whether fan speed should be decreased, increased by a step change, increased over time or maximized; (b) increasing fan speed to a maximum fan speed if at least one of said comparisons indicates that the maximum fan speed is desired; (c) increasing fan speed in a step change to a reference fan speed if at least one of said comparisons indicates that a step increase in fan speed is desired; (d) increasing fan speed to a reference fan speed at a reference rate of change if at least one of said comparisons indicates that an increase in fan speed over time is desired; (e) decreasing fan speed to a reference fan speed if said comparisons indicate that a decrease in fan speed is desired; (f) determining a first magnitude of power required to drive a compressor of a refrigeration system and the fan at a first speed; (g) increasing fan speed to a second fan speed and determining a second magnitude of power required to drive the compressor and the fan at the second fan speed; (h) if the first magnitude of power is greater than the second magnitude of power, increasing the fan speed to the second fan speed at a desired rate; and if the first magnitude of power is less than the second magnitude of power, decreasing the fan speed at a desired rate.

2. A method for controlling a fan that cools devices of a vehicle comprising: (a) comparing the current temperatures of at least first and second said devices to multiple temperature ranges of each of said devices and determining on the basis of said comparisons whether fan speed should be decreased, increased by a step change, increased over time or maximized; (b) increasing fan speed to a maximum fan speed if at least one of said comparisons indicates that the maximum fan speed is desired; (c) increasing fan speed in a step change to a reference fan speed if at least one of said comparisons indicates that a step increase in fan speed is desired; (d) increasing fan speed to a reference fan speed at a reference rate of change if at least one of said comparisons indicates that an increase in fan speed over time is desired; (e) decreasing fan speed to a reference fan speed if said comparisons indicate that a decrease in fan speed is desired; (f) determining a variation of fan efficiency vs. fan speed; (g) increasing fan speed, if a slope of the variation of fan efficiency vs. fan speed for the current fan speed is positive and an increase in fan speed is desired; and (h) decreasing fan speed, if a slope of the variation of fan efficiency vs. fan speed for the current fan speed is negative and a decrease in fan speed is desired.

3. A method for controlling a fan that cools devices of a vehicle comprising: (a) comparing the current temperatures of at least first and second said devices to multiple temperature ranges of each of said devices and determining on the basis of said comparisons whether fan speed should be decreased, increased by a step change, increased over time or maximized; (b) increasing fan speed to a maximum fan speed if at least one of said comparisons indicates that the maximum fan speed is desired; (c) increasing fan speed in a step change to a reference fan speed if at least one of said comparisons indicates that a step increase in fan speed is desired; (d) increasing fan speed to a reference fan speed at a reference rate of change if at least one of said comparisons indicates that an increase in fan speed over time is desired; (e) decreasing fan speed to a reference fan speed if said comparisons indicate that a decrease in fan speed is desired; (f) decreasing fan speed, if decreasing fan speed from a current fan speed would increase a fan efficiency and a decrease in fan speed is desired; and (g) increasing fan speed, if increasing fan speed would increase a fan efficiency and an increase in fan speed is desired.

4. A method for controlling a fan that cools devices of a vehicle comprising: (a) comparing the current temperatures of at least first and second said devices to multiple temperature ranges of each of said devices and determining on the basis of said comparisons whether fan speed should be decreased, increased by a step change, increased over time or maximized; (b) increasing fan speed to a maximum fan speed if at least one of said comparisons indicates that the maximum fan speed is desired; (c) increasing fan speed in a step change to a reference fan speed if at least one of said comparisons indicates that a step increase in fan speed is desired; (d) increasing fan speed to a reference fan speed at a reference rate of change if at least one of said comparisons indicates that an increase in fan speed over time is desired; (e) decreasing fan speed to a reference fan speed if said comparisons indicate that a decrease in fan speed is desired; (f) determining a fan noise limit; (g) determining a variation of fan noise vs. fan speed; and (h) decreasing fan speed, if a current fan noise is greater than the fan noise limit, an increase in fan speed is not desired, and a slope of the variation of fan noise vs. fan speed for the current fan speed is negative.

5. A method for controlling a fan that cools devices located in a vehicle comprising the steps of: (a) comparing the current temperature of at least a first device and a second device to multiple temperature ranges for each of said devices and determining on the basis of said comparisons whether fan speed should be changed; (b) increasing fan speed to a maximum fan speed if at least one of said comparisons indicates that the maximum fan speed is desired; (c) increasing fan speed to a reference fan speed if at least one of said comparisons indicates that an increase in fan speed to less than the maximum fan speed is desired; (d) decreasing fan speed to a reference fan speed if said comparisons indicate that a decrease in fan speed is desired; (e) determining a first magnitude of power required to drive a compressor of a refrigeration system and the fan at a first speed; (f) increasing fan speed to a second fan speed and determining a second magnitude of power required to drive the compressor and the fan at the second fan speed; (g) if the first magnitude of power is greater than the second magnitude of power, increasing the fan speed to the second fan speed at a desired rate; and (h) if the first magnitude of power is less than the second magnitude of power, decreasing the fan speed at a desired rate.

6. A method for controlling a fan that cools devices located in a vehicle comprising the steps of: (a) comparing the current temperature of at least a first device and a second device to multiple temperature ranges for each of said devices and determining on the basis of said comparisons whether fan speed should be changed; (b) increasing fan speed to a maximum fan speed if at least one of said comparisons indicates that the maximum fan speed is desired; (c) increasing fan speed to a reference fan speed if at least one of said comparisons indicates that an increase in fan speed to less than the maximum fan speed is desired; (d) decreasing fan speed to a reference fan speed if said comparisons indicate that a decrease in fan speed is desired; (e) determining a variation of fan efficiency vs. fan speed; (f) increasing fan speed, if a slope of the variation of fan efficiency vs. fan speed for the current fan speed is positive and an increase in fan speed is desired; and (g) decreasing fan speed, if a slope of the variation of fan efficiency vs. fan speed for the current fan speed is negative and a decrease in fan speed is desired.

7. A method for controlling a fan that cools devices located in a vehicle comprising the steps of: (a) comparing the current temperature of at least a first device and a second device to multiple temperature ranges for each of said devices and determining on the basis of said comparisons whether fan speed should be changed; (b) increasing fan speed to a maximum fan speed if at least one of said comparisons indicates that the maximum fan speed is desired; (c) increasing fan speed to a reference fan speed if at least one of said comparisons indicates that an increase in fan speed to less than the maximum fan speed is desired; (d) decreasing fan speed to a reference fan speed if said comparisons indicate that a decrease in fan speed is desired; (e) decreasing fan speed, if decreasing fan speed from a current fan speed would increase a fan efficiency and a decrease in fan speed is desired; and (f) increasing fan speed, if increasing fan speed would increase a fan efficiency and an increase in fan speed is desired.

8. A method for controlling a fan that cools devices located in a vehicle comprising the steps of: (a) comparing the current temperature of at least a first device and a second device to multiple temperature ranges for each of said devices and determining on the basis of said comparisons whether fan speed should be changed; (b) increasing fan speed to a maximum fan speed if at least one of said comparisons indicates that the maximum fan speed is desired; (c) increasing fan speed to a reference fan speed if at least one of said comparisons indicates that an increase in fan speed to less than the maximum fan speed is desired; (d) decreasing fan speed to a reference fan speed if said comparisons indicate that a decrease in fan speed is desired; (e) determining a fan noise limit; (f) determining a variation of fan noise vs. fan speed; (g) decreasing fan speed, if a current fan noise is greater than the fan noise limit, an increase in fan speed is not desired, and a slope of the variation of fan noise vs. fan speed for the current fan speed is negative.

\* \* \* \* \*